UNITED STATES PATENT OFFICE.

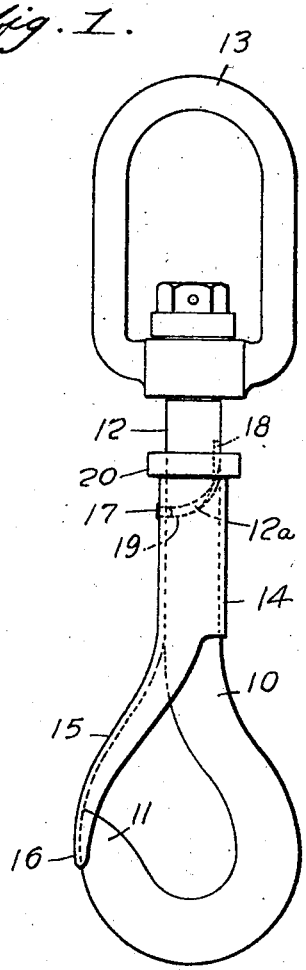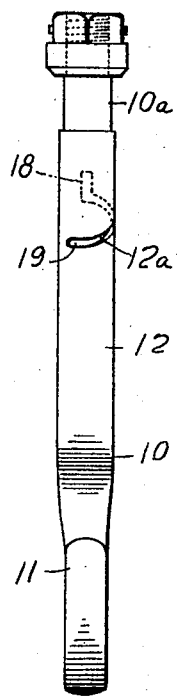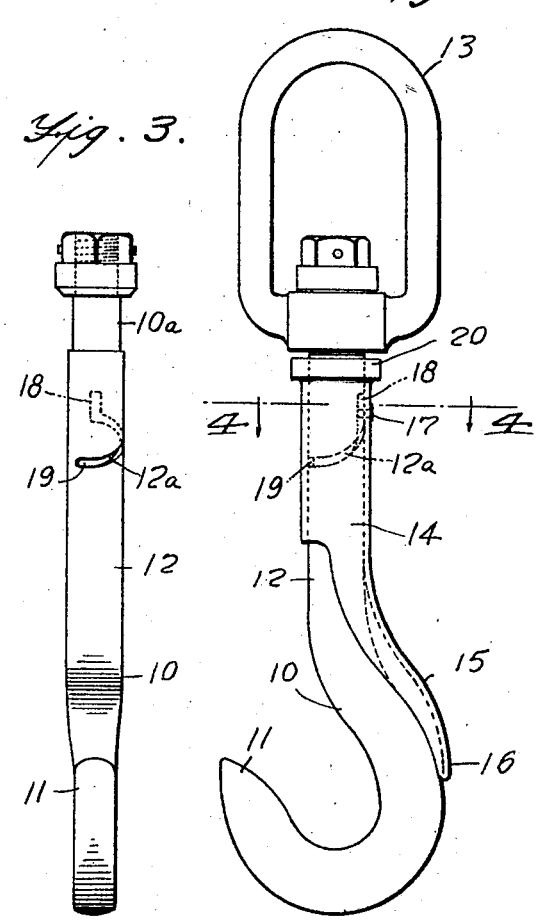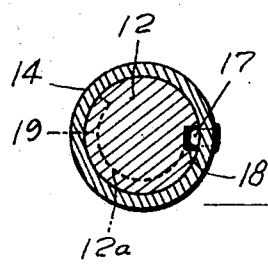

BENJAMIN COUSINS, OF TULSA, OKLAHOMA.

HOISTING-HOOK.

1,394,068.

Specification of Letters Patent.  Patented Oct. 18, 1921.

Application filed September 9, 1920. Serial No. 409,080.

*To all whom it may concern:*

Be it known that I, BENJAMIN COUSINS, a citizen of the United States, residing at Tulsa, in the county of Tulsa and State of Oklahoma, have invented certain new and useful Improvements in Hoisting-Hooks, of which the following is a specification, reference being had to the accompanying drawings.

This invention relates to improvements in hoisting hooks and has as its object provision of a hoisting hook having means for preventing the article carried by the hook from being accidentally displaced therefrom.

A further object of the invention is to provide a hook of the type above described wherein the guard employed to prevent accidental displacement of an article carried by the hook is so constructed that the natural action in grasping the shank of the hook to remove an article therefrom displaces the guard to permit such removal.

A still further object of the invention is to provide a hook of the above character wherein the guard when released subsequently to the placing on the hook of an article automatically assumes the locking position to prevent displacement of the article.

A still further object of the invention is to provide a hook of this character which is sufficiently simple in construction and operation to render the same practical for manufacture and use.

Other objects and advantages of the invention will become apparent throughout the course of the following description.

In the accompanying drawings wherein for the purpose of illustration is shown a preferred embodiment of my invention and wherein like reference characters designate like parts throughout:

Figure 1 is a side elevation of a safety hook constructed in accordance with my invention, the guard member being in the operative position.

Fig. 2 is a similar view showing the guard member in the elevated or inoperative position.

Fig. 3 is a front elevation of the hook, the sleeve being removed from the shank to show the groove formed therein and Fig. 4 is a section taken on the line 4—4 of Fig. 2.

Referring now more particularly to the drawings, the numeral 10 indicates a hook as a whole embodying the usual point 11 and shank 12. The upper end of the shank is adapted as at 10$^a$ for the reception of a swivel eye 13 by means of which the hook may be attached to a cable or other supporting element. The elements hereinbefore described constitute a type of hook commonly manufactured for use in hoisting.

Slidably mounted upon the shank of the hook is a sleeve 14 having projecting downwardly therefrom and at an angle thereto a guard 15 convex-concavo in cross section although not necessarily limited to such construction. The lower end of the guard 15 may advantageously be curved, as at 16 to correspond to the curvature of the point 11 of the hook even though the remainder of the guard be formed of other desired shape. Such a construction not only stiffens the lower end of the guard but also enables it to overlap and fit closely against the exterior of the point of the hook, thus supporting the lower portion of the guard against accidental bending as well as insuring that the point of the hook shall be efficiently protected against all liability of accidentally catching in any object when the hook is lifting a load.

The construction shown, however, is preferred in that it permits the integral formation of the guard and extension at a single dieing operation.

It will be obvious that the guard may be rotated upon the shank to bring the tip or curved portion 16 of the extension 15 into engagement with the point 11 and that when such engagement is once made it may not be readily displaced in view of the fact that the sleeve must be shifted vertically before the guard can be removed. The weight of the sleeve and its extension will, of course, operate to prevent such displacement and in addition the fact that the extension 15 is when the hook is under strain at an angle to the line of strain would cause any article carried by the hook engaging such extension to tend to twist the extension and sleeve with relation to the shank and thereby cause the sleeve to bind.

As an additional precaution to insure against vertical displacement of the sleeve I have provided in the shank a groove 12ª extending spirally therearound and having its lower end terminating at a point such that the curved portion 16 is in engagement with the tip when the dog 17 of the sleeve which operates in this groove is in the lower end of the groove. If desired the upper end of the groove which is disposed at the back of the shank of the hook may be provided with a vertically upwardly extending portion 18 and the lower end of the groove may be provided with a short horizontal extension 19. It will be obvious that the dog 17 operating in the horizontal portion 19 will effectually prevent vertical displacement of the guard until the dog has been shifted to one side in the groove and that even in event of such shifting the vertical displacement must be accompanied by a simultaneously rotary motion to elevate the sleeve and its extension.

In the use of my hook, assuming the sleeve to be elevated and disposed at the rear portion of the hook with the dog 17 engaging in the vertical portion of the groove, when the article to be suspended has been placed upon the hook the sleeve is released and moving downwardly by gravity will assume a position with the curved portion 16 thereof engaging the point of the hook from which position it is difficult to accidentally displace it for the reason hereinbefore set forth. This downward movement is materially assisted by forming or securing upon the sleeve a weight 20. When it is desired to remove the article from the hook the operator in grasping the sleeve surrounding the shank of the hook rotates the sleeve causing the same to elevate and move the extension 15 back of the hook when the article may be readily removed.

That a hook constructed in accordance with my invention is capable of many and varied uses and will be highly efficient will be obvious to those familiar with the art particularly when used where vertical displacement of the load carried by the hook is likely to occur as for example when removing the sucker rods of oil wells. These rods, a string of which is often as long as four thousand feet, are formed in twenty-five foot lengths and when being removed often stick. It will be obvious that such removal will necessitate the use of a hook from which the load carried may be released with a minimum expenditure of time.

As many obvious changes may be resorted to in the structure of my device in the shape, size and arrangement of the various parts thereof without in any manner departing from the spirit of my invention, I do not limit myself to the specific construction hereinbefore set forth except as so limited by the subjoined claims.

Having now described my invention, what I claim is:

1. The combination with a hook embodying the usual shank and point, of a sleeve slidably and rotatably mounted upon said shank and embodying an extension adapted to engage the point of the hook with its lower end and means connecting said shank and sleeve whereby said sleeve is shifted vertically on said shank when rotated, comprising a spiral groove formed in said shank and a dog secured to said sleeve and engaging in said groove.

2. The combination with a hook embodying the usual shank and point of a sleeve slidably and rotatably mounted upon said shank and embodying an extension adapted to engage the point of the hook with its lower end and means connecting said shank and sleeve whereby said sleeve is shifted vertically on said shank when rotated, comprising a spiral groove formed in said shank and a dog secured to said sleeve and engaging in said groove, said groove having its upper end disposed upon the side of said shank remote from said point.

3. The combination with a hook embodying the usual shank and point, of a sleeve slidably and rotatably mounted upon said shank and embodying an extension adapted to engage the point of the hook with its lower end and means connecting said shank and sleeve whereby said sleeve is shifted vertically on said shank when rotated, comprising a spiral groove formed in said shank and a dog secured to said sleeve and engaging in said groove, said groove being provided at such upper end with a vertical extension.

4. The combination with a hook embodying the usual shank and point, of a sleeve slidably and rotatably mounted upon said shank and embodying an extension adapted to engage the point of the hook with its lower end and means connecting said shank and sleeve whereby said sleeve is shifted vertically on said shank when rotated, comprising a spiral groove formed in said shank and a dog secured to said sleeve and engaging in said groove, said groove having its upper end provided with a vertical extension and having its lower end provided with a horizontal extension.

5. The combination with a hook embodying a shank and point, of a guard for preventing accidental release of said hook from the load supported thereby, said guard comprising a sleeve encircling said shank and rotatable with respect thereto, and an extension extending from one side of said sleeve, said extension being linearly curved to correspond substantially to the linear curvature of the back of said hook.

6. The combination with a hook embodying a shank and point, of a guard for preventing accidental release of said hook from the load supported thereby, said guard comprising a sleeve and an extension extending from one side of said sleeve, said sleeve being rotatably mounted upon and slidable longitudinally with respect to said shank, and said extension being concave upon its inner face adjacent its free end.

In testimony whereof I hereunto affix my signature.

BENJAMIN COUSINS.